United States Patent [19]
Cottriel et al.

[11] Patent Number: 5,290,012
[45] Date of Patent: Mar. 1, 1994

[54] WEDGE FOR TREE HARVESTING HAVING AN IMPROVED DRIVE HEAD

[76] Inventors: Robert S. Cottriel, 13937 Tucker Ave., Sylmar, Calif. 91342; Belt J. Shepherd, P.O. Box 3868, Wofford Heights, Calif. 93285; Larry M. Shepherd, P.O. Box 2320, Lake Isabella, Calif. 93240

[21] Appl. No.: 867,064

[22] Filed: Apr. 10, 1992

Related U.S. Application Data

[63] Continuation of Ser. No. 650,006, Feb. 4, 1991, abandoned.

[51] Int. Cl.⁵ .............................................. B66F 13/00
[52] U.S. Cl. ................................. 254/104; 144/193 D
[58] Field of Search ................. 254/104; 144/193 R, 144/193 C, 193 D

[56] References Cited

U.S. PATENT DOCUMENTS

| | | | |
|---|---|---|---|
| 188,376 | 3/1877 | Kelly | 254/104 |
| 1,424,161 | 8/1922 | Foley | 254/104 |
| 2,542,368 | 2/1951 | Smith | 254/104 |
| 3,185,442 | 5/1965 | Hemphill | 254/104 |
| 3,381,937 | 5/1968 | Zillman | 254/104 |
| 4,451,024 | 5/1984 | Shepherd | 254/104 |

*Primary Examiner*—Bruce M. Kisliuk
*Assistant Examiner*—Eileen P. Morgan
*Attorney, Agent, or Firm*—Robert L. Harrington

[57] ABSTRACT

An improved wedge for the felling of trees. The wedge is of a synthetic material and has a metal insert integrally molded at its base or head end. The insert, which is molded flush with the head end of the wedge body receives the impacting blows of a driving tool and protects the head end of the wedge from damage. The insert integrally molded within the body of the wedge permits the wedge to be tapered along its full length.

3 Claims, 2 Drawing Sheets

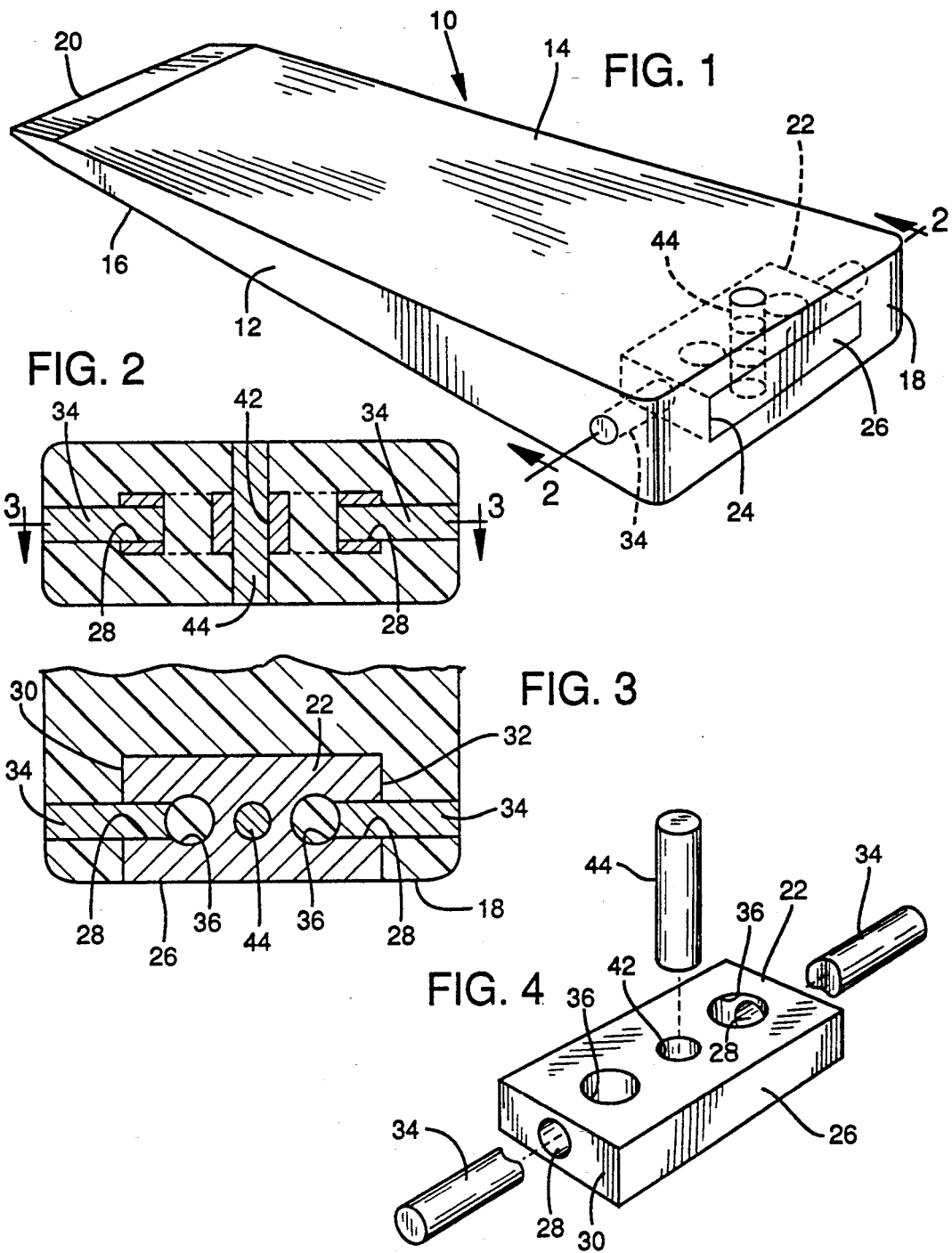

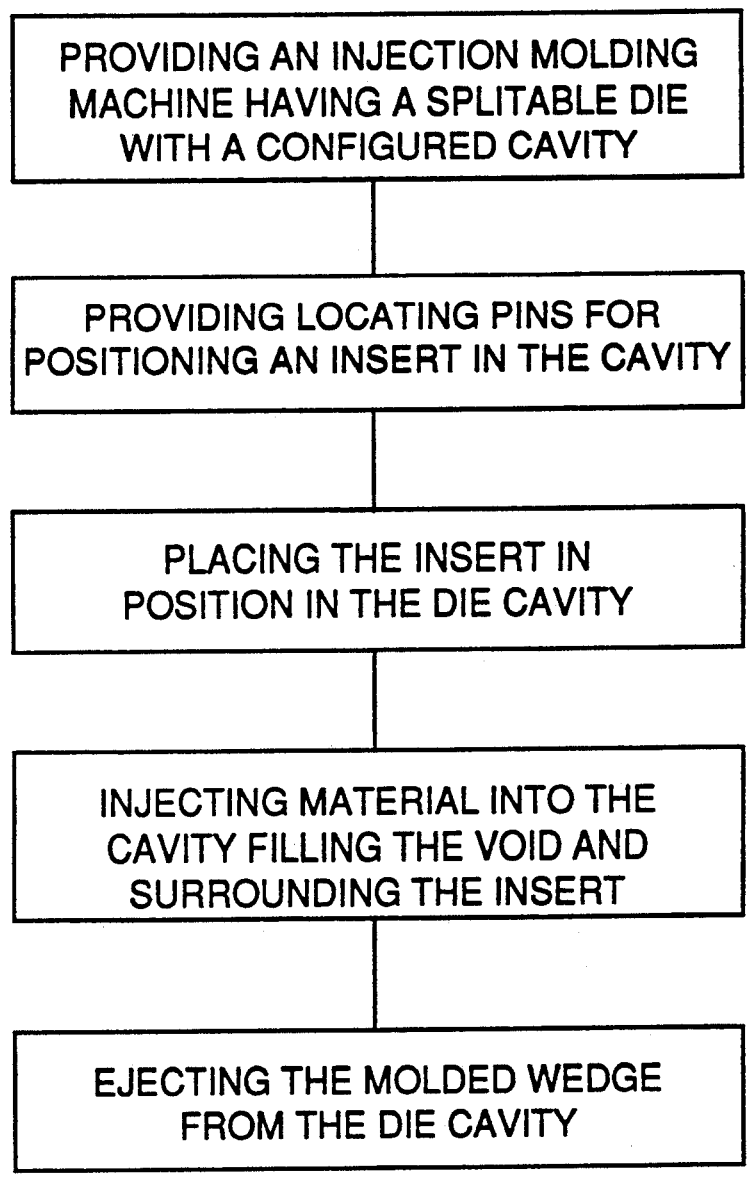

WEDGE FOR TREE HARVESTING HAVING AN IMPROVED DRIVE HEAD

This is a continuation of copending applictation Ser. No. 07/650,006 filed Feb. 4, 1991 now abandoned.

BACKGROUND INFORMATION

1. Field of the Invention

This invention relates to wedges used by loggers in harvesting trees and in particular it relates to an improved drive head for a wedge utilized in harvesting trees.

2. Background of the Invention

Long tapered wedges are tools that have long been used as an aid to loggers in felling trees. The wedges are used to maintain the dimension of the saw kerf as the trunk of the tree is sawed and at the completion of the saw cut the wedges are used to provide a lift for directing the fall of the tree. The wedges taper from a head end (base) down to a thin edge.

Trees are harvested, that is, cut down by loggers using chain saws. The logger generally cuts a V notch into a side of the tree to provide a "hinge" for felling the tree in a desired direction. The logger then produces a saw cut through the trunk of the tree, starting on the side opposite the V notch. As the saw cut progresses through the trunk of the tree, the weight of the tree will cause a bending of the tree to collapse the kerf to bind the saw in the cut. To prevent this from happening, long tapered wedges are driven into the saw kerf to maintain the saw kerf dimension. The thin edge of the wedges are inserted into the saw kerf and large hammers, such as sledge hammers are used to forcibly drive the wedges into the kerf by impacting the head of the wedge. When the saw cut is completed, the logger may drive the wedges in further to provide a lift (i.e., tilt the tree) to direct the fall of the tree.

As previously mentioned, the wedges are driven into the saw kerf by striking (i.e. impacting) the head end of the wedge by driving tools, such as sledge-hammers. Currently, many of the wedges are produced from a plastic material. The plastic wedge is lighter, is not subject to rust and is easier to drive into the saw kerf. However, the wedges are used over and over and the repeated pounding by the hammer deforms the head of the wedge. The plastic material will not withstand the repeated pounding from the hammer and the wedge soon deteriorates.

To lengthen the useful life of the plastic wedges, metal caps or ends have been affixed to the head end of the wedge. The metal caps are of the same width as the base of the wedge. However, the full metal cap increases both the weight and cost. It is desirable to have a less heavy and less costly wedge that performs better than the heretofore old plastic wedge even though it may not perform as well as the plastic wedge with full metal cap.

BRIEF SUMMARY OF THE INVENTION

A preferred embodiment of the present invention is a long tapered wedge of synthetic material. An insert is strategically positioned, i.e., embedded into the head end of the wedge to receive and transmit the impacting blows of a driving tool. The insert substantially protects the head end of the wedge from damage due to the impacting blows of the driving tool. The insert being integrally molded with the body of the wedge is positively retained and is not subject to dislodging. The integral molding of the insert permits a full length taper along the length of the wedge.

BRIEF DESCRIPTION OF THE DRAWINGS

FIG. 1 is a view of a wedge in accordance with the present invention;

FIG. 2 is a view along view lines 2—2 of FIG. 1;

FIG. 3 is a view along view lines 3—3 of FIG. 2;

FIG. 4 is a view of the insert portion of the wedge of FIG. 1; and

FIG. 5 is a flow diagram illustrating the method of producing the wedge of FIG. 1.

DESCRIPTION OF THE PREFERRED EMBODIMENT

Refer now to FIG. 1 of the drawings. It illustrates a preferred embodiment of a felling wedge 10. The wedge 10 is of a plastic material, such as ABS, and has an insert 22, preferably of steel, fitted within a cavity 24 of the body 12 of the wedge 10.

As shown, the body 12 of the wedge 10 is tapered, having sides 14 and 16 extending from a head end 18 and converging toward each other to merge into a thin edge defined by chamfered end 20. The cavity 24 extends inwardly from the end 18 into the body 12 and is centrally positioned in reference to the end 18. The insert 22 is fixedly fitted in the cavity 24 of the body 12 and has a surface 26 flush with the surface of head end 18.

The insert is further illustrated in FIG. 4, and the sectional views of FIGS. 2 & 3 show the mounting details of the insert 22 within the cavity 24. As shown, bores 28 are provided in ends 30 and 32 of the insert 22 for receiving locator pins 34. Through bores 36 which intersect the bores 28 are provided in the insert 22 that extend through the sides of the insert. A through bore 42 positioned midway between and parallel to the bores 36 is provided for receiving a locator pin 44. The locator pins 34, 44 positioned in the bores 28, 42 of the insert 22 are for strategically positioning the insert 22 in a die cavity of an injection molding machine.

The wedge 10 is typically on the order of 8 inches long by 3 inches wide and has a thickness that varies from a thin edge (chamfered end 20) to 1-¼ inches at the base (head end 18). These dimensions may of course be altered to suit the need. In use, for example in the felling of trees, the wedge 10 is initially driven into a saw kerf to prevent the kerf from closing to bind a saw in the cut and at the completion of the saw cut the wedge is driven in further to provide a lift as an aid directing the fall of a tree. The thin edge (chamfered end 20) is placed in the saw kerf and the wedge 10 is forcibly driven into the kerf by using a driving tool, such as a sledge hammer. The user strikes the base (end 18) of the wedge 10 with the hammer to initially drive the wedge into the kerf to maintain the saw kerf dimension. The insert 22 fitted flush with the end 18 receives the impacting blows of the hammer and transmits the force of the blows to the body 12 of the wedge to forcibly drive the wedge into the kerf The insert 22 protects the head end 18 of the body 12 from damage. At the completion of the saw cut the wedge 10 may be driven further into the saw kerf to provide a lift (i.e., further separate the saw kerf thus tilting the tree) as an aid directing the direction of the fall of the tree.

It is preferable to produce the wedge 10 by a process referred to as insert injection molding, the wedge 10 being produced by an injection molding machine. The insert 22 is inserted into a die cavity of a mold of the injection molding machine, the die cavity having a configured shape to produce the wedge 10 of a shape as illustrated in FIG 1. As is known, the mold is of split construction, being openable for the placement of the insert 22 and for the ejection of the finished product (wedge 10). The locating pins 34 and 44 placed in the bores of the insert 22 maintain the insert 22 in a strategic location within the die cavity such that the insert 22 is centrally positioned with reference to end 18 of the body 12 and has surface 26 flush with end 18. Plastic material, such as ABS, is injected in the die cavity, the plastic material filling the void of the cavity thus surrounding the insert 22 and filling the bores 36. The mold is opened and the finished wedge 10 is ejected. The finished wedge 10 thus has the insert 22 integrally molded in the body 12.

An alternate method of producing the wedge 10 is to produce the body 12 of the wedge 10 by injection molding. After the molding process is complete the cavity 24 is produced as by blind broaching and the insert 22 is press fit into the cavity to thereby be retained in the body 12 if the wedge 10. In this method of producing the wedge 10, the locator pins are of course not required for the insert 22.

It will be apparent to those skilled in the art that man modifications and variations ma be made without deviating from the true spirit and scope of the invention. The invention is therefore not to be determined from the embodiments described and illustrated but is to be determined from the appended claims.

What is claimed is:

1. A wedge for use in felling trees whereby the wedge is driven into a kerf behind a cutting chain of a chain saw to old the kerf open and to assist in directing the fall of the trees, said wedge comprising;
    a body of plastic material continuously tapering from wide to narrow from an extreme head end to a thin edge at the opposite end, and having a cavity with an opening at the head end of the body,
    a solid insert of hard metal material fixedly mounted in said cavity of said body and dimensioned to tightly fit the cavity with a surface of said insert closing the opening of the cavity and flush with a surface of said head end of said body, said surface of said solid insert receiving the impacting blows of a driving tool and transmitting the force of the blows to said body.

2. A wedge as defined in claim 1, wherein, said insert is integrally molded within said body.

3. A wedge as defined in claim 1, wherein;
    said cavity is formed by blind broaching and said insert is press fit into said cavity.

* * * * *